(12) United States Patent (10) Patent No.: US 7,539,015 B2
Springer et al. (45) Date of Patent: May 26, 2009

(54) RISER CARD HOUSING

(75) Inventors: Gregory Springer, Sunnyvale, CA (US); Vinh Diep, Milpitas, CA (US); Ricardo Mariano, Hayward, CA (US); Douglas L. Heirich, Palo Alto, CA (US); Peter Russell-Clarke, San Francisco, CA (US); Daniele De Iuliis, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/831,214

(22) Filed: Jul. 31, 2007

(65) Prior Publication Data

US 2009/0034189 A1 Feb. 5, 2009

(51) Int. Cl.
*H05K 7/20* (2006.01)
(52) U.S. Cl. ........................ 361/695; 361/694; 361/831; 454/184
(58) Field of Classification Search .................. 361/687, 361/694–695, 831; 454/184
See application file for complete search history.

(56) References Cited

U.S. PATENT DOCUMENTS

| 5,438,476 | A | * | 8/1995 | Steffes | ........................ | 361/683 |
| 6,772,246 | B2 | * | 8/2004 | Kim et al. | ..................... | 710/62 |
| RE39,784 | E | * | 8/2007 | Hsueh | ........................ | 361/697 |

* cited by examiner

*Primary Examiner*—Gregory D Thompson
(74) *Attorney, Agent, or Firm*—IP Strategy Group, P.C.

(57) ABSTRACT

A housing for accommodating one or more riser cards is disclosed. The one or more riser cards include a first riser card. The first riser card may be configured to carry at least a first component. The housing may include a first inlet side configured to allow first air to flow into the housing for cooling the first component. The housing may also include an outlet side configured to allow at least a first portion of the first air to flow away from the housing. The housing may be configured to be disposed inside an enclosure of an electronic device. At least one of the first inlet side and the outlet side may include a first guiding structure configured to guide movement of the first riser card relative to the housing.

30 Claims, 4 Drawing Sheets

RISER CARD HOUSING

BACKGROUND OF THE INVENTION

An electronic device, such as a computer, may include one or more modular, serviceable, and/or replaceable components that may be added, serviced, and/or replaced for one or more purposes, such as repair or system upgrade. For example, a computer may include one or more memory modules, such as dual inline memory module (DIMM) that can be replaced for increasing the memory of the computer.

In general, the memory module may be directly installed on the motherboard of the computer. According to the onboard installation arrangement, the memory module may be blocked by other components and/or structures inside the enclosure of the computer. As a result, it may be inconvenient or even difficult for a user to install, remove, and/or replace the memory module. It also may be inconvenient or difficult for a user to add additional memory modules.

Many other heat-generating electronic components also may be installed on the motherboard. Generally, if temperatures of electronic components are not maintained within desirable temperature ranges, the performance and durability of the electronic components may be compromised. Given the concentration of heat-generating components, it may be difficult or costly to sufficiently cool the memory module as well as other components.

For example, for sufficient cooling, one or more fans of a high power may be required. Accordingly, additional material and manufacturing costs for the computer may be incurred. Further, there also may be additional energy consumption and noise associated with operating the computer.

SUMMARY OF INVENTION

An embodiment of the present invention relates to a housing for accommodating one or more riser cards. The one or more riser cards include a first riser card. The first riser card may be configured to carry at least a first component. The housing may include a first inlet side configured to allow first air to flow into the housing for cooling the first component. The housing may also include an outlet side configured to allow at least a first portion of the first air to flow away from the housing. The housing may be configured to be disposed inside an enclosure of an electronic device. At least one of the first inlet side and the outlet side may include a first guiding structure configured to guide movement of the first riser card relative to the housing.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1A:
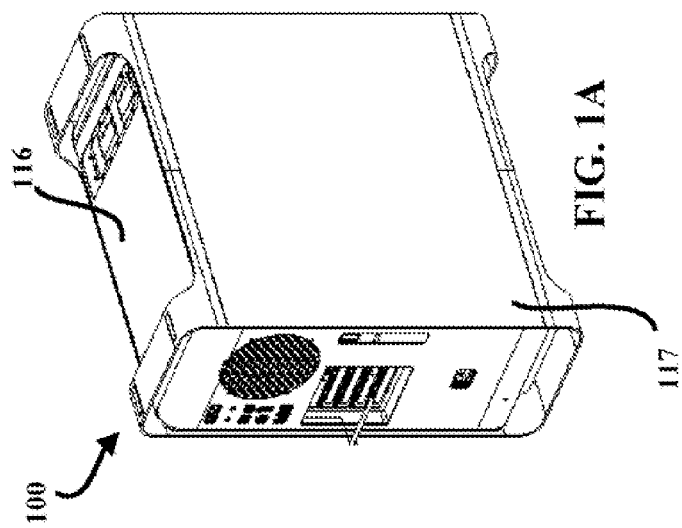
FIG. 1A illustrates a perspective view of an electronic device in accordance with one or more embodiments of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

One or more embodiments of the present invention relate to a housing configured to be disposed inside an enclosure of an electronic device for accommodating one or more riser cards. The one or more riser cards may include a first riser card. The first riser card may be configured to carry at least a first component, e.g., a memory module such as dual inline memory module (DIMM). The electronic device may represent, for example, one of a computing device (e.g., a computer), a networking device (e.g., a switch), an entertainment device (e.g., a television), etc. At least four sides of the housing may be formed of a single metal piece with same finishing as the enclosure.

The housing may include a first inlet side configured to allow first air to flow into the housing for cooling the first component and an outlet side configured to allow at least a first portion of the first air to flow away from the housing. At least one of the first inlet side and the outlet side may include a first guiding structure configured to guide movement of the first riser card relative to the housing. The first guiding structure may include part of at least one of an inlet structure and an outlet structure. The first guiding structure may be further configured to secure the first riser card in place.

In one or more embodiments, the first inlet side may include the first guiding structure, and the outlet side may include a second guiding structure also configured to guide movement of the first riser card relative to the housing. The housing may further include a second inlet side configured to allow second air to flow into the housing for cooling the first component. The second inlet side may be perpendicular to the first inlet side. The electronic device or the housing may further include a fan disposed at one of the first inlet side and the outlet side.

The housing may further include an opening configured to allow the first riser card to protrude from the housing to connect to a circuit board of the electronic device. The opening may be further configured to allow at least a second portion of the first air to cool at least an onboard component on the circuit board. The housing may further include another opening disposed over the first riser card and configured to facilitate access to the first component.

The housing may further include an aerodynamic structure, e.g., a baffle, configured to direct the first air toward at least the first component. Additionally or alternatively, the housing may further include an aerodynamic structure configured to maximize a speed of the first air at the first component.

The housing may further include a flange configured to confine one or more components external to the housing and to block the first air from the one or more components.

One or more embodiments of the present invention relate to an electronic device that includes the housing or a variation of the housing.

The electronic device may also include a lid configured to limit the movement of the first rising card in a disengaging direction. The lid may be further configured to guide the first air.

The features and advantages of the present invention may be better understood with reference to the figures and discussions that follow.

FIG. 1A illustrates a perspective view of an electronic device 100 In accordance with one or more embodiments of the present invention. As illustrated in the example of FIG. 1A, electronic device 100 may include enclosure 116 configured to accommodate various components inside electronic device 100. Electronic device 100 may further include lid 117 that can be opened, such that the various components may be installed and/or accessed.

Figure 1B:
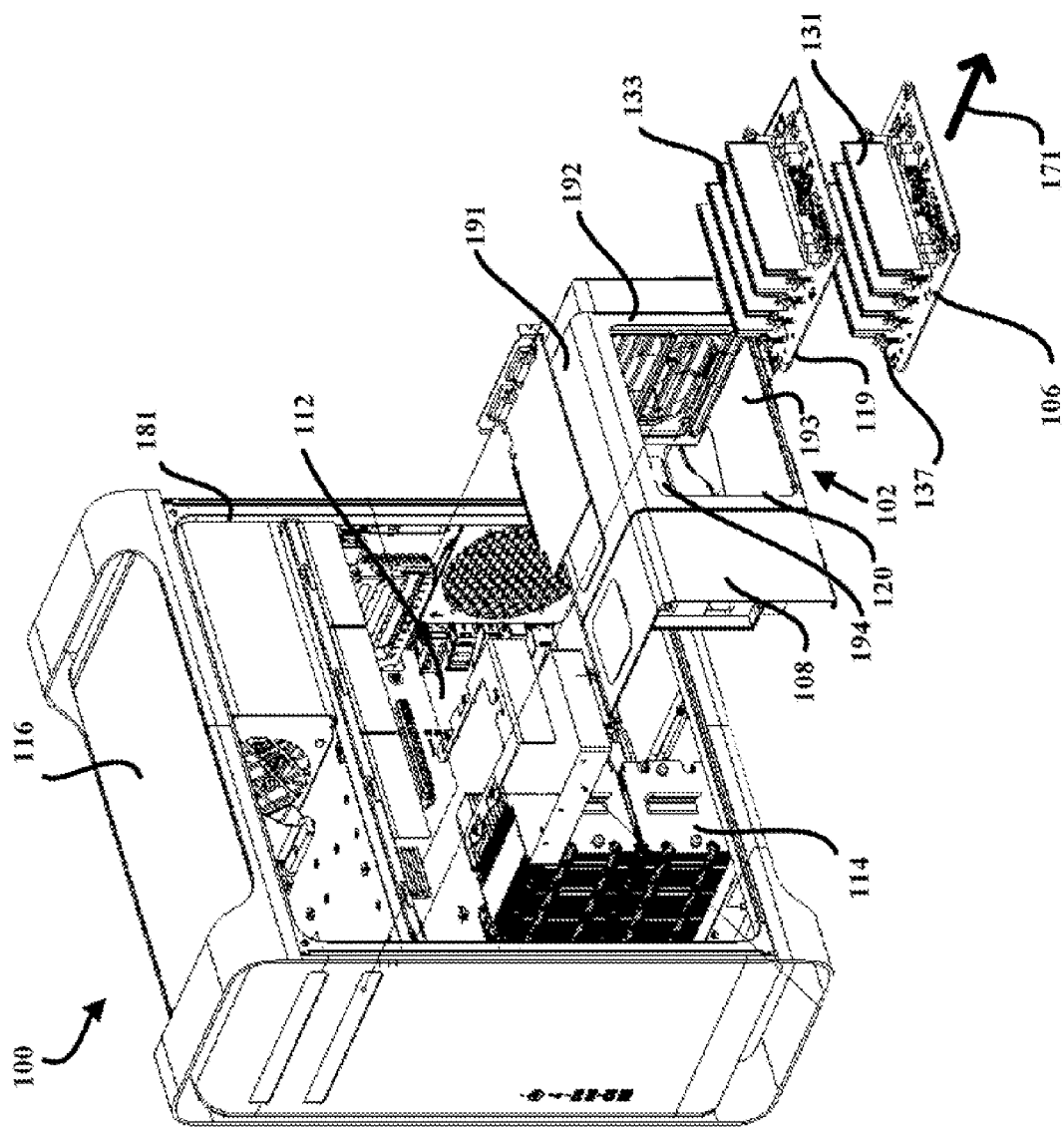
FIG. 1B illustrates an exploded view of the electronic device in accordance with one or more embodiments of the present invention.

FIG. 1B illustrates an exploded view of electronic device 100 in accordance with one or more embodiments of the present invention. In one or more embodiments, electronic device 100 may include a housing 102 configured to accommodate one or more riser cards, such as riser card 119 and riser card 106. Each of the one or more riser cards may be configured to carry one or more components, such as memory modules 131 and 133.

For example, memory module 131 may be installed on riser card 106. In turn, riser card 119 may be inserted through opening 120 into housing 102. Housing 102 may include another opening, which may be positioned opposite opening, such that connector 137 of riser card 106 may protrude from housing 102 to connect to circuit board 112 of electronic device 100.

With the one or more components installed on the one or more riser cards, and with the riser cards installed inside housing 102, housing 102 may be disposed, as one integrated module, inside enclosure 116 of electronic device 100. Implementing housing 102 with pre-installed components (e.g., memory modules) as an integrated module may significantly simplify assembly of electronic device. As a result, the manufacturing cost of electronic device may be reduced.

After housing 102 has been disposed inside enclosure 116, lid 117 may be installed to cover opening 181 of enclosure 116. Lid 117 may be configured to limit movement of riser cards 119 and 106 in a disengaging direction 171, such that riser cards 119 and 106 may be secured in place. Lid 117 may also be configured to cover opening 120 of housing 102 and/or to direct air flow in housing 102.

Housing 102 may be disposed next to a heat sink 114 and may be connected with heat-sink cover 108. An outer surface of heat-sink cover 108 and an outer surface of housing 102 may align. Housing 102 may include four sides 191, 192, 193, and 194 formed of a single metal piece. Sides 191-194, enclosure 116, and heat-sink cover 108 may be formed of the same metal material and/or may have the same finishing.

Figure 2:
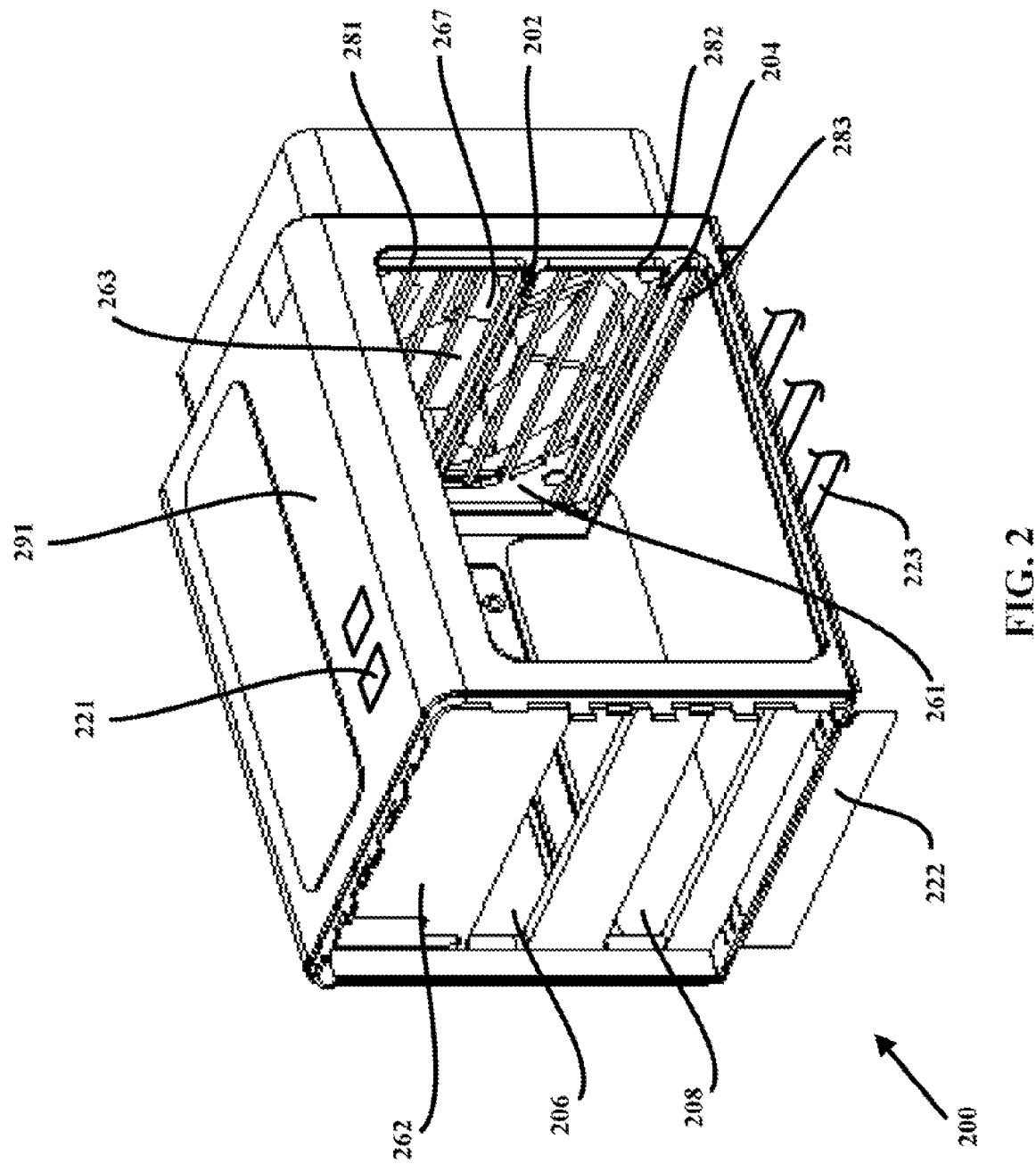
FIG. 2 illustrates a perspective view of a riser card housing in accordance with one or more embodiments of the present invention.

FIG. 2 illustrates a perspective view of a riser card housing 200 in accordance with one or more embodiments of the present invention. Riser card housing 200 may include an inlet/outlet side 261 that includes a fan 263 configured for promoting air flow through riser card housing 200. Inlet/outlet side 261 may include one or more inlet/outlet structure, such as inlet/outlet structures 281, 282, and 283, configured to guide/regulate the air flow. Each inlet/outlet structure may include one or more inlets/outlets. For example, inlet/outlet structures 281 may include inlet/outlet 267.

At least a portion of the one or more inlet/outlet structures may form one or more guiding structures, such as guiding structures 202 and 204, configured to facilitate insertion of one or more riser cards into riser card housing 200 and to guide movement of the one or more riser cards relative to riser card housing 200. The one or more guiding structures may also be configured to secure the one or more riser cards in place, for example, through friction.

Riser card housing 200 may also include an inlet/outlet side 262 configured to allow air to flow into/away front riser card housing 200. Inlet/outlet side 262 may include one or more inlets/outlets, such as inlet/outlet 206 and inlet/outlet 208.

Riser card housing 200 may further include an additional inlet/outlet side 291. Additional inlet/outlet side 291 may include one or more additional inlets/outlets, such as additional inlet/outlet 221, configured to allow additional air to flow into riser card housing 200.

In one or more embodiments, inlet/outlet side 261 may represent an outlet side. Accordingly, inlet/outlet side 262 may represent an inlet side, and additional inlet/outlet side 291 may represent a second inlet side.

In one or more embodiments, inlet/outlet side 261 may represent an inlet side. Accordingly, inlet/outlet side 262 may represent an outlet side, and additional inlet/outlet side 291 may represent a second outlet side.

On the outside of riser card housing 200, riser card housing 200 may further include one or more flanges, such as flange 222, configured to accommodate and confine one or more components, such as cable 223, such that the one or more components are arranged in order. Flange 222 may be further configured to block air flow away from the one or more components, which may not require substantial cooling, such that the air flow may be effectively and efficiently utilized for cooling components carried by the one or more riser cards disposed inside rising card housing 200.

Figure 3:
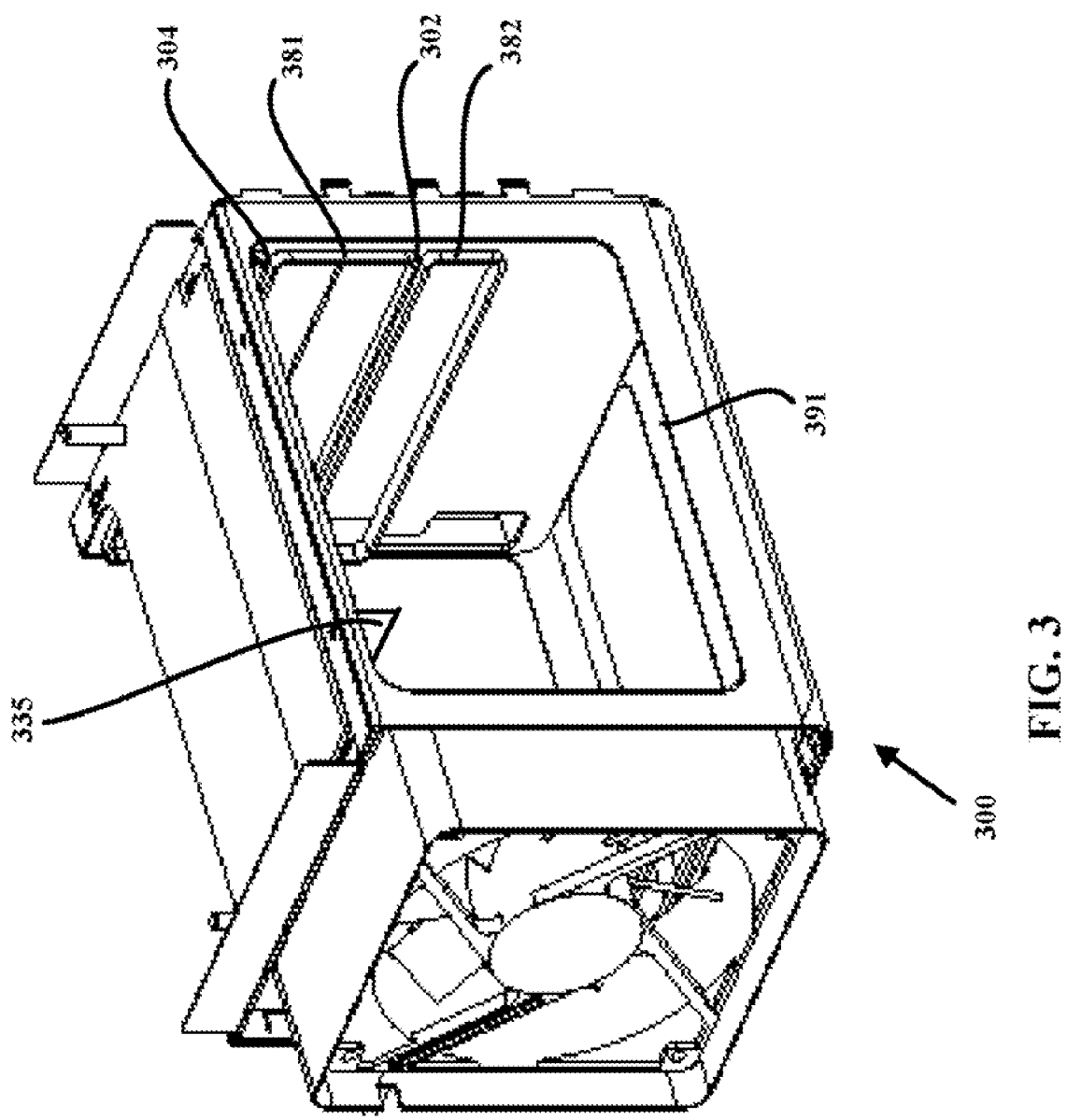
FIG. 3 illustrates a perspective view of a riser card housing in accordance with one or more embodiments of the present invention.

FIG. 3 illustrates a perspective view of a riser card housing 300 in accordance with one or more embodiments of the present invention. Riser card housing 300 may include one or more inlet/outlet structures, such as inlet/outlet structures 381 and 382, configured to regulate air flow into/away from riser card housing 300.

At least a portion of the one or more inlet/outlet structures may form one or more guiding structures, such as guiding structures 302 and 304, configured to guide movement of one or more riser cards relative to riser card housing 300, to guide insertion of the one or more riser cards into riser card housing 300, and/or to secure the one or more riser cards inside riser card housing 300.

Riser card housing 300 may further include one or more aerodynamic structures, such as a baffle 335 or a shaped feature, for directing air flow toward one or more particular components carried by the one or more riser card. The one or more particular components may represent one or more electronic components that tend to generate a greater amount of heat than others. For example, the one or more particular components may represent one or more Advanced Memory Buffer (AMB) chips. The allocation and geometry of the one or more aerodynamic structures may be tuned and/or optimized for optimal cooling of the components disposed inside and/or outside riser card housing 300.

Riser card housing 300 may further include opening 391 configured to allow air to flow out of riser card housing 300 to cool components outside of riser card housing 300. For example, the components may represent on-board components of an electronic device that are disposed inside the enclosure of the electronic device and next to riser card housing 300.

Figure 4:
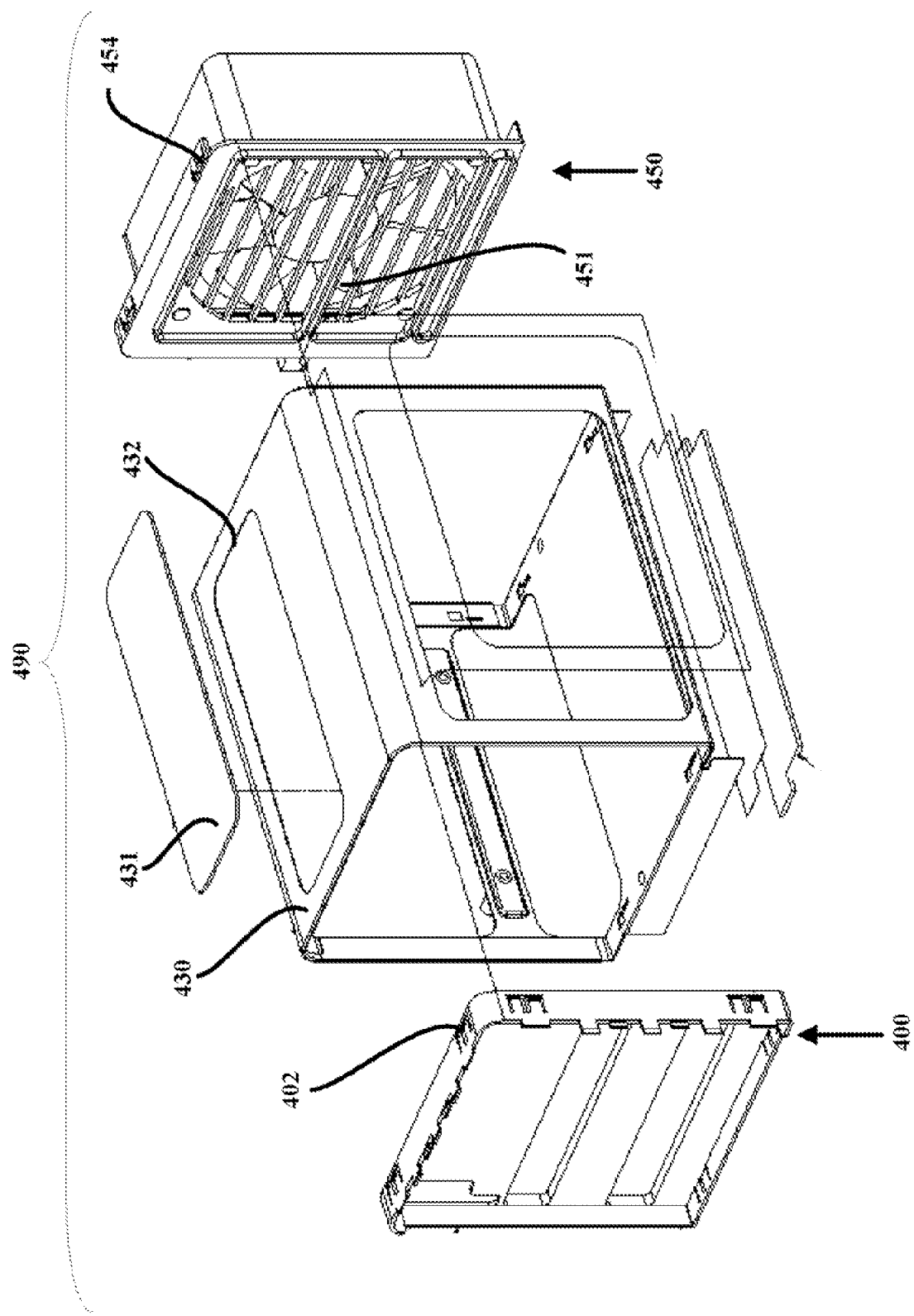
FIG. 4 illustrates an exploded view of a riser card housing in accordance with one or more embodiments of the present invention.

FIG. 4 illustrates an exploded view of a riser card housing 490 in accordance with one or more embodiments of the present invention. Riser card housing 490 may include an inlet/outlet side 400, an inlet/outlet side 450, and a tunnel 430.

Inlet/outlet side 400 may be formed of a plastic material. Inlet/outlet side 400 may include one or more engaging features, such as a snap feature 402, for mechanically coupling inlet/outlet side 400 with tunnel 430.

Inlet/outlet side 450 may include a fan 451 configured to promote air flow into/away from riser card housing 490. In one or more embodiments, fan 451 may be configured to draw healed air away from tunnel 430. In one or mote embodiments, fan 451 may be configured to draw room-temperature air into tunnel 430. Inlet/outside side 450 may include one or more engaging features, such as a snap feature 454, for mechanically coupling inlet/outlet side 450 with tunnel 430.

Tunnel 430 may include an opening 432 configured to facilitate access to one or more components installed on a riser card disposed inside tunnel 430. For example, through opening 432, a user may be able to remove a memory module from a riser card or to add a memory module onto the riser card without extracting the riser card from tunnel 430. Opening 432 may be covered by a removable lid 431.

As can be appreciated from the foregoing, embodiments of the present invention may provide a riser card housing with pre-installed components as an integrated, readily removable module. As a result, electronic device assembly and service may be significantly simplified. Advantageously, manufacturing and servicing costs for electronic devices may be reduced.

Further, embodiments of the invention may include parts that perform multiple functions. For example, an inlet/outlet structure may also he configured to direct air flow, to guide movement of a riser card, and to secure the riser card. As a result, part counts of electronic devices may be reduced. Advantageously, material costs and manufacturing costs for electronic devices may be further reduced.

Embodiments of the invention may also effectively distribute and/or separate heat generating components through utilizing riser cards. Embodiments of the invention may also provide tuned and/or optimized cooling for components disposed inside and/or outside riser card housings. Advantageously, performance and durability of electronic devices may be optimized.

While this invention has been described in terms of several embodiments, there are alterations, permutations, and equivalents, which fall within the scope of this invention. It should also be noted that there are many alternative ways of implementing the methods and apparatuses of the present invention. Furthermore, embodiments of the present invention may find utility in other applications. The abstract section is provided herein for convenience and, due to word count limitation, is accordingly written for reading convenience and should not be employed to limit the scope of the claims. It is therefore intended that the following appended claims be interpreted as including all such alternations, permutations, and equivalents as fall within the true spirit and scope of the present invention.

What is claimed is:

1. A housing for accommodating one or more riser cards, the one or more riser cards including a first riser card, the first riser card configured to carry at least a first component, the housing comprising:
a first side;
a second side, the one or more riser cards being configured to be disposed between the first side and the second side and configured to be disposed parallel to the first side and the second side;
a first inlet side configured to allow first air to flow into the housing for cooling the first component;
an outlet side configured to allow at least a first portion of the first air to flow away from the housing; and
an aerodynamic structure disposed inside the housing, the aerodynamic structure protruding from the first side and configured to direct the first air toward at least the first component,
wherein the housing is configured to be disposed inside an enclosure of an electronic device, and
at least one of the first inlet side and the outlet side includes a first guiding structure configured to guide movement of the first riser card relative to the housing.

2. The housing of claim 1 further comprising a second inlet side configured to allow second air to flow into the housing for cooling the first component, the second inlet side being perpendicular to the first inlet side.

3. The housing of claim 1 wherein the first guiding structure includes part of at least one of an inlet structure and an outlet structure.

4. The housing of claim 1 wherein the first inlet side includes the first guiding structure, and the outlet side includes a second guiding structure configured to guide movement of the first riser card relative to the housing.

5. The housing of claim 1 wherein the first guiding structure is further configured to secure the first riser card in place.

6. The housing of claim 1 further comprising a fan disposed at one of the first inlet side and the outlet side.

7. The housing of claim 1 further comprising an opening configured to allow the first riser card to protrude from the housing to connect to a circuit board.

8. The housing of claim 7 wherein the opening is further configured to allow at least a second portion of the first air to cool at least an onboard component on the circuit board.

9. The housing of claim 1 wherein the aerodynamic structure has a geometry that is configured for optimal cooling of the first component, the first component being configured to generate more heat than all other components carried by the first riser card.

10. The housing of claim 1 wherein the aerodynamic structure represents a baffle configured to maximize a speed of the first air at the first component.

11. The housing of claim 1 further comprising a flange disposed perpendicular to the second side, the flange being configured to confine one or more components external to the housing and configured to block the first air from the one or more components, the second side being configured to be disposed between the first riser card and the one or more components.

12. The housing of claim 1 wherein the movement of the first rising card in a disengaging direction is limited by a lid of the enclosure of the electronic device.

13. The housing of claim 1 wherein at least four sides of the housing form a tunnel between the first inlet side and the outlet side.

14. The housing of claim 1 wherein the first component represents a memory module.

15. The housing of claim 1 wherein the first side includes an opening disposed over the first riser card and configured to facilitate access to the first component.

16. An electronic device comprising:
   an enclosure; and
   a housing disposed inside the enclosure and configured to accommodate at least a first riser card, the first riser card configured to carry at least a first component, the housing including at least a first side and a second side, the first riser card being configured to be disposed between the first side and the second side and configured to be disposed parallel to the first side and the second side,
   wherein the housing further includes a first inlet side configured to allow first air to flow into the housing for cooling the first component and an outlet side configured to allow at least a first portion of the first air to flow away from the housing, and
   at least one of the first inlet side and the outlet side includes a first guiding structure configured to guide movement of the first riser card relative to the housing.

17. The electronic device of claim 16 wherein the housing further includes a second inlet side configured to allow second air to flow into the housing for cooling the first component, the second inlet side being perpendicular to the first inlet side.

18. The electronic device of claim 16 wherein the first guiding structure includes part of at least one of an inlet structure and an outlet structure.

19. The electronic device of claim 16 wherein the first inlet side includes the first guiding structure, and the outlet side includes a second guiding structure configured to guide movement of the first riser card when relative to the housing.

20. The electronic device of claim 16 wherein the first guiding structure is further configured to secure the first riser card in place.

21. The electronic device of claim 16 further comprising a fan disposed at one of the first inlet side and the outlet side.

22. The electronic device of claim 16 wherein the housing further includes an opening configured to allow the first riser card to protrude from the housing to connect to a circuit board.

23. The electronic device of claim 22 wherein the opening is further configured to allow at least a second portion of the first air to cool at least an onboard component on the circuit board.

24. The electronic device of claim 16 wherein the housing further includes an aerodynamic structure disposed inside the housing, the aerodynamic structure protruding from the first side and configured to direct the first air toward at least the first component, the aerodynamic structure having a geometry that is configured for optimal cooling of the first component, the first component being configured to generate more heat than all other components carried by the first riser card.

25. The electronic device of claim 24 wherein the aerodynamic structure represents a baffle configured to maximize a speed of the first air at the first component.

26. The electronic device of claim 16 wherein the housing further includes a flange disposed perpendicular to the second side, the flange being configured to confine one or more components external to the housing and configured to block the first air from the one or more components, the second side being configured to be disposed between the first riser card and the one or more components.

27. The electronic device of claim 16 further comprising a lid configured to limit the movement of the first rising card in a disengaging direction.

28. The electronic device of claim 27 wherein the lid is further configured to guide the first air.

29. The electronic device of claim 16 wherein at least four sides of the housing are formed of a single metal piece with same finishing as the enclosure, the four sides of the housing forming a tunnel between the first inlet side and the outlet side.

30. The electronic device of claim 16 wherein the first component represents a memory module.

* * * * *